United States Patent [19]

Watanabe

[11] 4,398,224
[45] Aug. 9, 1983

[54] TIME BASE CORRECTING APPARATUS

[75] Inventor: Nobuhiko Watanabe, Tokyo, Japan

[73] Assignee: Sony Corporation, Tokyo, Japan

[21] Appl. No.: 298,522

[22] Filed: Sep. 1, 1981

[30] Foreign Application Priority Data

Sep. 5, 1980 [JP] Japan .............................. 55-123347

[51] Int. Cl.³ ............................................. H04N 5/95
[52] U.S. Cl. ................... 358/339; 358/336;
 360/36.2; 360/38.1; 371/38
[58] Field of Search ............... 358/314, 320, 336, 337,
 358/339; 360/36.1, 36.2, 38.1; 371/30, 37, 38;
 375/118

[56] References Cited

U.S. PATENT DOCUMENTS

| | | | |
|---|---|---|---|
| 3,931,638 | 1/1976 | Lentz et al. | 360/36.1 |
| 4,188,616 | 2/1980 | Kazami et al. | 371/37 |
| 4,215,376 | 7/1980 | Mach | 358/339 X |
| 4,271,519 | 6/1981 | Hall | 371/38 |
| 4,287,529 | 9/1981 | Tatami et al. | 360/36.2 X |

FOREIGN PATENT DOCUMENTS

2034942 A 6/1980 United Kingdom .

*Primary Examiner*—Robert L. Richardson
*Attorney, Agent, or Firm*—Lewis H. Eslinger; Alvin Sinderbrand

[57] ABSTRACT

Time base correcting apparatus is provided for a digital signal supplied to such apparatus in the form of successive data blocks with each data block including plural data words. A memory is provided, having plural addressable storage locations, each adapted to store a respective data block. A write address generator generates write-in addresses to address particular storage locations into which the supplied data blocks are written; and an error detector detects whether the supplied data block contains an error. If no error is detected, a write-in circuit writes that data block into the addressed storage location; but if an error is detected, the data block is inhibited from being stored. An error store also is provided to store an error flag which is, for example, reset when the nono-erroneous data block is written into the addressed storage location, and is set when an error in that data block is detected. A read address generator generates read-out addresses to address those storage locations from which storage data blocks are read. When the contents of an addressed storage location are read out, the error flag associated with that data block is set regardless of its actual condition, thereby preventing subsequent re-use of the contents of that addressed storage location in the event that the data block stored therein is not replaced but is attempted to be re-read.

19 Claims, 24 Drawing Figures

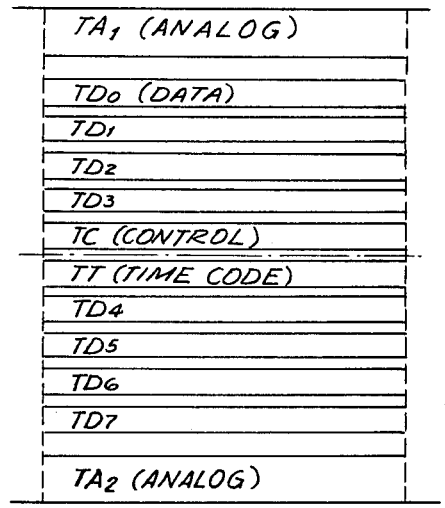
FIG.1
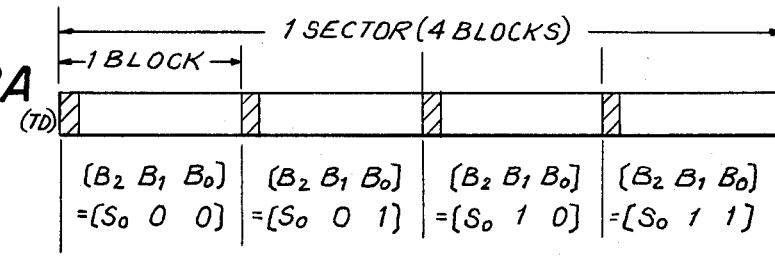
FIG.2A
FIG.2B
FIG.2C
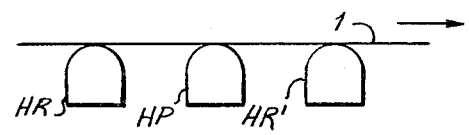
FIG.3

FIG.4
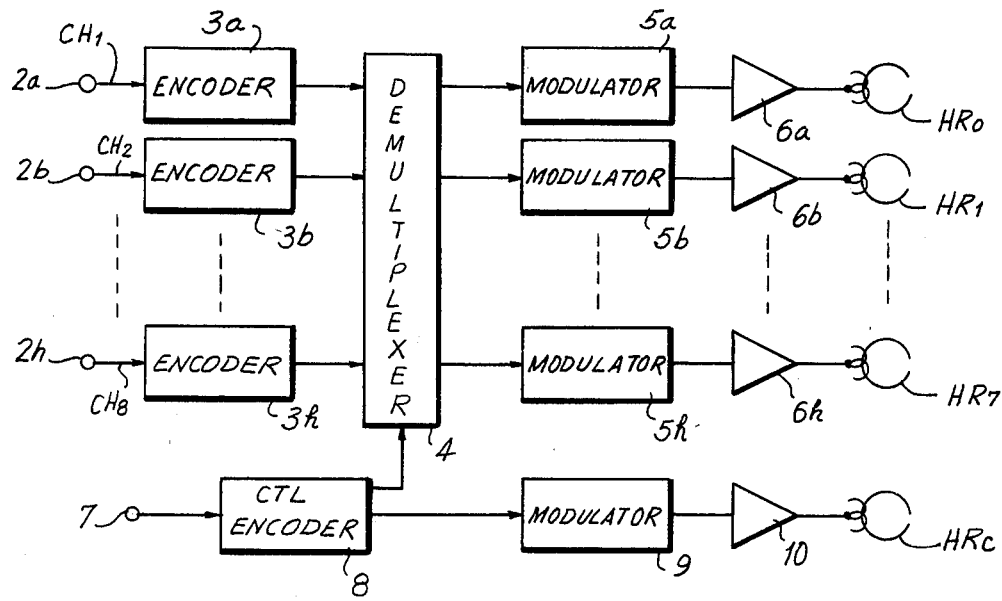
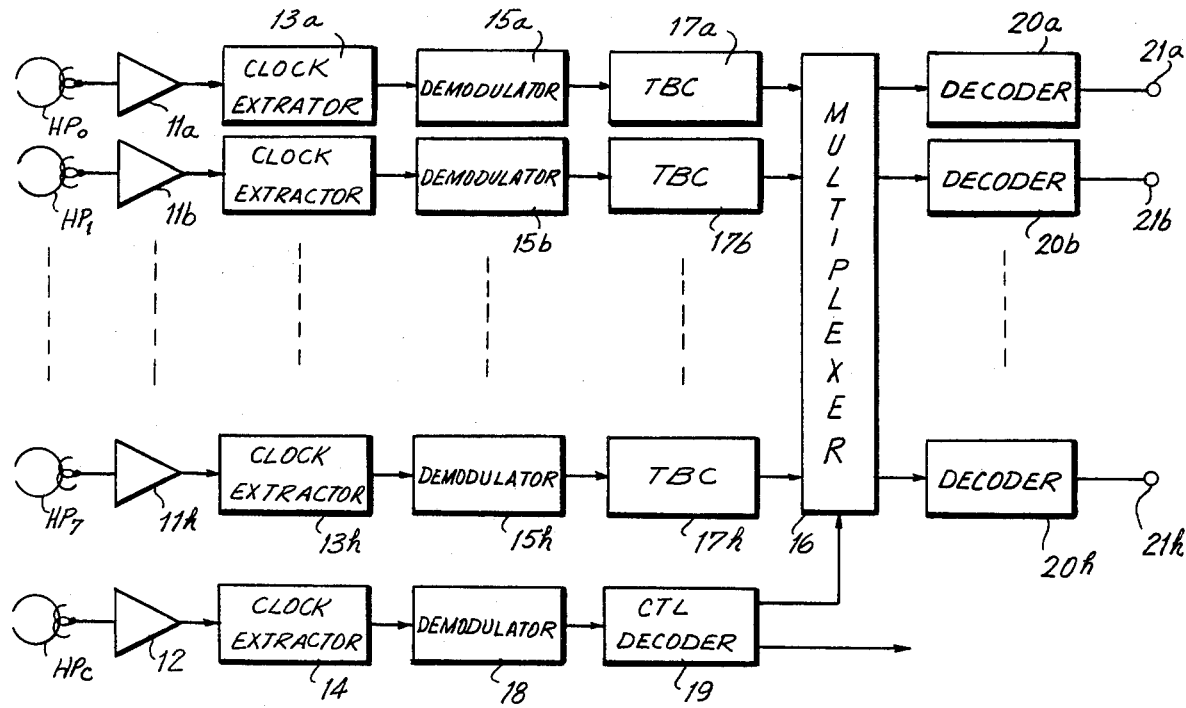
FIG.5

| SY NC | $W_{12}''$ | $W_{11}''$ | $W_8''$ | $W_7''$ | $W_4''$ | $W_3''$ | $Q_2'$ | $Q_1'$ | $P_2''$ | $P_1''$ | $W_{10}''$ | $W_9''$ | $W_6''$ | $W_5''$ | $W_2$ | $W_1$ | CRC CODE |

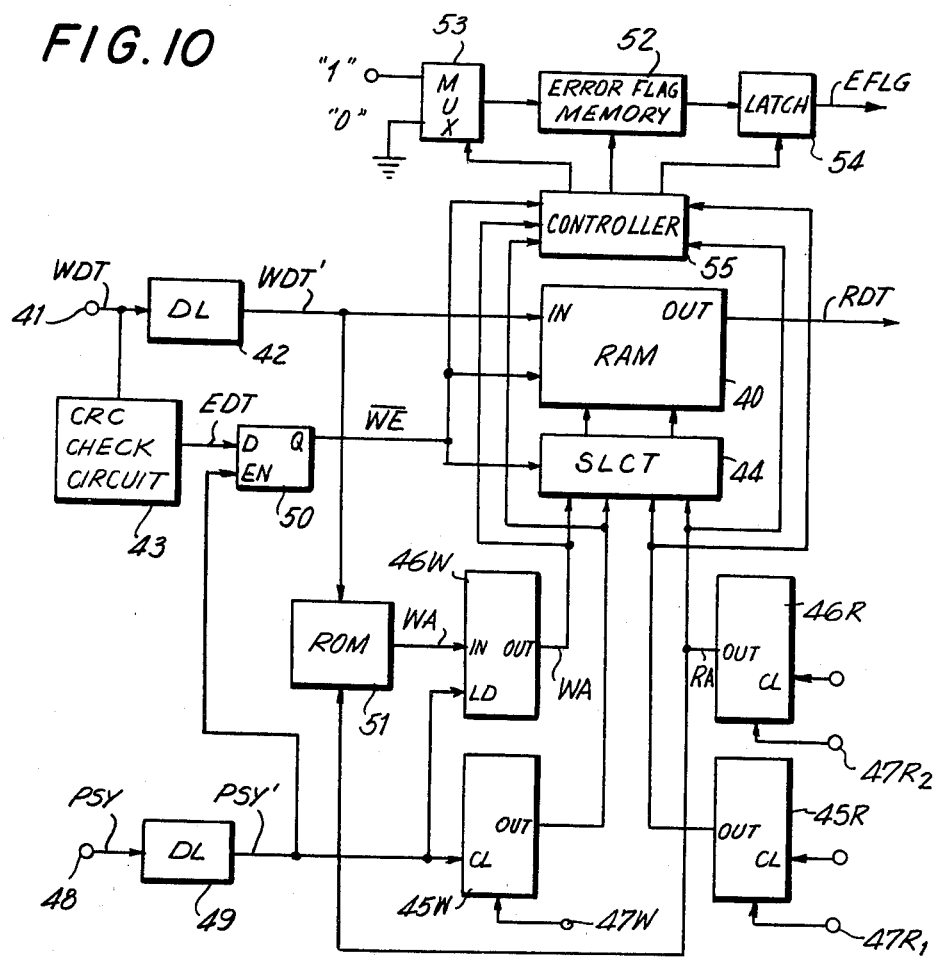

FIG.12
| BA\RA | [0] | [1] | [2] | [3] |
|---|---|---|---|---|
| 0 | 4 | 5 | 2 | 3 |
| 1 | 4 | 5 | 6 | 3 |
| 2 | 4 | 5 | 6 | 7 |
| 3 | 0 | 5 | 6 | 7 |
| 4 | 0 | 1 | 6 | 7 |
| 5 | 0 | 1 | 2 | 7 |
| 6 | 0 | 1 | 2 | 3 |
| 7 | 4 | 1 | 2 | 3 |
} WA
FIG.13A (WDT) 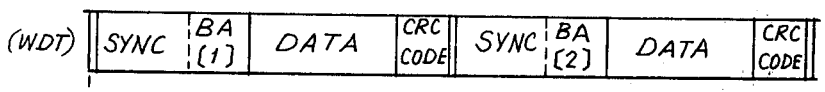
FIG.13B (EDT) 
FIG.13C (WDT') 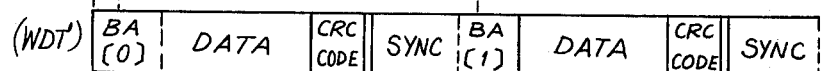
FIG.13D (PSY) 
FIG.13E (PSY') 
FIG.13F (WA) 
FIG.13G (WE) 

TIME BASE CORRECTING APPARATUS

BACKGROUND OF THE INVENTION

This invention relates to a time base connector and, more particularly, to such a time base corrector which is readily adapted to correct or compensate time base variations in a reproduced digital signal wherein the possibility of errors is substantially minimized.

It is known that, when a signal is recorded on, for example, magnetic tape and subsequently reproduced therefrom, the timing, or clocking of the reproduced signal may differ from that of the originally recorded signal. For example, changes in the motion of the tape, or expansion or compression of the magnetic tape, or errors in the capstan servo control used to drive that tape may result in time fluctuations or variations which are commonly referred to as time base errors. This problem is particularly acute when the recorded signal is a digital signal, such as a digitized representation of video or audio information. In view of such time base errors, various time base error correction systems have been designed for correcting or compensating such errors. Typically, the reproduced signal is written into a memory at a write-in rate that is synchronized with the actual rate at which the signal is reproduced. Subsequently, the stored signal is read out at a fixed, reference rate. Thus, time base errors are eliminated. Typical uses of time base correctors are found in video tape recording/reproducing systems, such as those used for industrial purposes.

Most time base correctors are digital devices which operate on digital information signals. When used in combination with a video recording/reproducing system, the usual analog video signal is converted into digital form, and the digitized video signal is supplied to the time base corrector wherein time base errors are corrected. Thereafter, the digitized video signal is re-converted back to analog form so as to be subsequently transmitted, displayed, or the like.

Recently, digital techniques have been applied to the recording of audio signals. For example, so-called PCM recorders have been proposed, wherein the audio signal is converted into digital form, such as a pulse code modulated (PCM) signal, and this PCM signal then is recorded. Since the PCM audio signal may be subjected to time base errors during reproduction, time base correctors have been proposed for such error correction or compensation. One example, of such a time base corrector is disclosed in U.S. Pat. No. 4,141,039.

In addition to time base errors, signals which are recorded and reproduced from a magnetic medium may be subjected to distortion, dropout, and other errors which, generally, are inherent in magnetic media. Such errors are particularly noticeable when digital signals are recorded and reproduced. This is because the obliteration of even a portion of the digital signal may have a magnified distortional effect when that digital signal subsequently is converted back into analog form. Consequently, in order to minimize such delterious effects due to these errors, various error correction encoding techniques have been proposed for use in recording digital signals. One such technique is known as the time-interleaved error correction encoding technique and is described in copending application Ser. No. 195,625, filed Oct. 9, 1980. In the time-interleaved error correction encoding technique, digital words which are temporarily spaced far apart are selected and combined in a data block. Thus, such data words are "time-interleaved" with each other. Such time-interleaving generally is carried out in stages, with a parity word being generated at each stage. Such parity words also are time-interleaved, resulting in a data block formed of data and parity words derived from substantially time-separated information. With this technique, if a particular data word or an entire data block is obliterated, the actual effect is to destroy isolated data words which can be reconstructed either by conventional error correction techniques (such as parity techniques), or may be "concealed" by replacing the destroyed word with a simulated word that is produced by interpolating those "good" words which precede and follow it.

While the time-interleaved error correction encoding technique is a powerful tool for minimizing the effect due to errors in recording/reproducing systems, it is important that, during time base correction thereof, the proper sequence of reproduced data blocks is maintained. Typically, when data blocks 1, 2, 3 and 4 are reproduced, they may be stored in storage locations 1, 2, 3 and 4, respectively, of the usual memory included in a time base corrector. Such storage is temporary and, during the subsequent read-out operation, storage locations 1, 2, 3 and 4 are read out in sequence. Thus, the very same sequence of data blocks that has been reproduced from the record medium and stored in memory is read out therefrom. It is important, therefore, that when data block 1 is reproduced from the tape, it is stored in storage location 1 rather than storage location 2. Likewise, all of the remaining data blocks should be stored in their proper storage locations.

Various possibilities exist, however, which give rise to the storage of a data block in an incorrect storage location, thereby changing the sequence in which such data blocks are read out from the memory of the time base corrector. For example, if each data block includes a preface synchronizing signal which is used to increment a write address generator, spurious signals may be erroneously interpreted as such a synchronizing signal, thereby changing the write address improperly. Alternatively, if the synchronizing signal is not detected because of, for example, dropout, the write address will not change, and the data block will be stored in an improper location.

Another difficulty associated with time base correction of time-interleaved data blocks is that associated with the detection of an error in a reproduced data block. In some time base correctors, if a reproduced data block is erroneous, it is not written into its assigned stage location in the memory. Rather, the preceding data block already stored in that location or, alternatively, the immediately preceding data block which had been reproduced from the record medium, is stored in such assigned location. Then, when the memory subsequently is read out, a redundant data block will be read, rather than reading out an erroneous data block therefrom. While this technique generally is satisfactory if the data blocks represent slowly changing information, this technique offers less than satisfactory results when the data blocks are formed of time-interleaved data words. There is a need, therefore, to prevent a data block which has already been read out from the time base corrector memory from being read out once again.

OBJECTS OF THE INVENTION

Therefore, it is an object of the present invention to provide an improved time base corrector which avoids the aforenoted disadvantages and defects of the prior art.

Another object of this invention is to provide a time base corrector which is readily adapted to correct time base errors in digital information that has been encoded in a time-interleaved error correction code.

A further object of this invention is to provide a time base corrector wherein data blocks are supplied thereto and, subsequently, are read out therefrom in the very same time sequence.

An additional object of this invention is to provide a time base corrector wherein erroneous information is not stored in the memory therein, and re-use of information which previously had been read out therefrom is prevented in the event that such information is re-read.

Various other objects, advantages and features of the present invention will become readily apparent from the ensuing detailed description, and the novel features will be particularly pointed out in the appended claims.

SUMMARY OF THE INVENTION

In accordance with this invention, time base correcting apparatus is provided for correcting time base errors in a digital signal that is supplied in the form of successive data blocks, each data block including plural data words. The time base correcting apparatus includes a memory having plural addressable storage locations, each being adapted to store a respective data block. A write address generator generates write-in addresses to address storage locations into which the supplied data blocks are written. Errors in the supplied data blocks are detected, and a data block containing a detected error is not written into the memory. An error flag memory stores error flags representing whether the supplied data blocks contain detected errors. If no error is detected, an associated error flag is reset. However, if an error is detected in the data block, its associated error flag is set. A read address generator generates read-out addresses to address those storage locations from which the stored data blocks are read. When a data block is read out from the memory, its associated error flag is set. Hence, this error flag remains set in the event that the contents of the read-out storage location are not replaced, such as when the data block supplied to be written into that storage location contains a detected error.

The error flag may be employed to control the use of the data which is read out from the memory. For example, if the error flag associated with a particular storage location has not been reset, the data in that storage location is not used. This prevents undesired re-use of a data block that has previously been read out from the memory and has not been replaced by a succeeding data block because of a detected error in that succeeding data block.

BRIEF DESCRIPTION OF THE DRAWINGS

The following detailed description, given by way of example, will best be understood in conjunction with the following drawings in which:

FIG. 1 is a schematic diagram representing one example of track patterns from which data is reproduced and supplied to the time base corrector of the present invention;

FIGS. 2A–2B and 2C are timing diagrams representing the various signals that are recorded in data and control tracks of the record medium with which the present invention is used;

FIG. 3 is a schematic diagram representing the arrangement of recording and playback transducers which may be used to edit the information recorded in the tracks shown in FIG. 1;

FIG. 4 is a block diagram of one embodiment of the recording section which may be used to record the information in the tracks shown in FIG. 1;

FIG. 5 is a block diagram of one embodiment of the reproducing section in which the present invention finds ready application;

FIG. 10 is a block diagram of the time base corrector of the present invention;

FIGS. 11A–11D are timing diagrams which are useful in understanding the operation of the time base corrector shown in FIG. 10;

FIG. 12 is a memory map which is useful in understanding the manner in which write-in addresses are generated in the time base corrector shown in FIG. 10; and FIGS. 13A–13G are timing diagrams which are useful in understanding the operation of the time base corrector shown in FIG. 10.

DETAILED DESCRIPTION OF CERTAIN PREFERRED EMBODIMENTS

Figure 6:
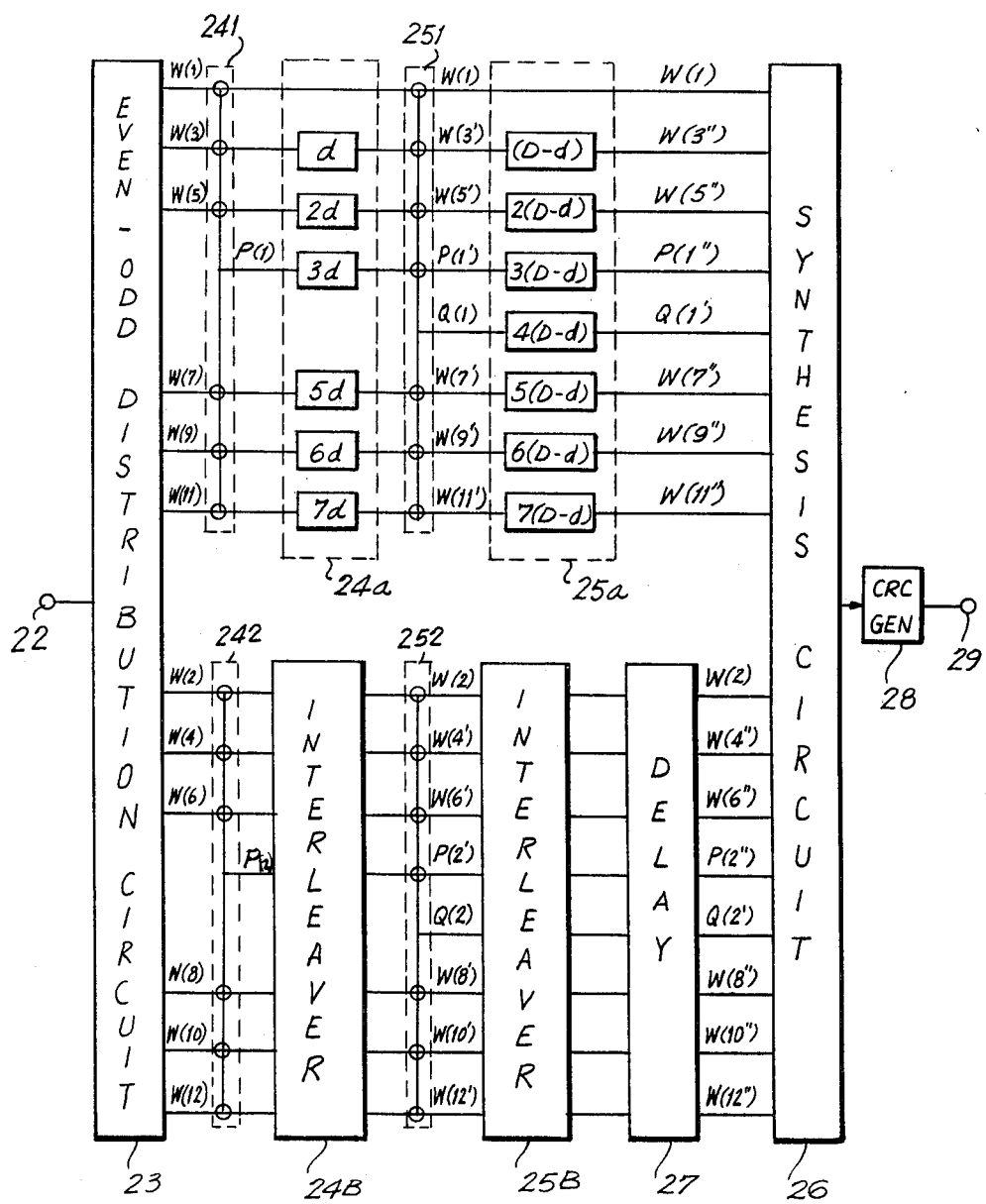
FIG. 6 is a block diagram of a time-interleaved error correction encoded which may be used in the recording section of FIG. 4.

Referring now to the drawings, and in particular to FIG. 1, there is illustrated one example of magnetic tape track configurations with which the present invention can be used. It should be readily appreciated from the forthcoming description that this invention can be used to record digitized information on various different types of record media, such as magnetic tape, magnetic disc, magnetic sheet, optical disc, and the like. For the purpose of the present description, it is assumed that the digitized information is recorded on magnetic tape. It is further assumed that this magnetic tape moves with respect to fixed recording and reproducing transducers. Preferably, the recording transducers, or heads, are arranged in an assembly so as to record plural tracks concurrently. These tracks are illustrated in FIG. 1 as being recorded on magnetic tape 1 of, for example, ¼ inch width. Although not shown herein, in other examples the tracks may be recorded on magnetic tape of one-half inch width, and the tracks also may be recorded on magnetic tape of one inch width. As illustrated, the respective tracks are parallel with each other and extend in the longitudinal direction along the magnetic tape.

In FIG. 1, tape 1 is illustrated as having marginal tracks $TA_1$ and $TA_2$ adjacent the opposite edges thereof. These marginal tracks are adapted to have analog signals recorded therein. For example, when tape 1 is used to record digital audio signals, analog tracks $TA_1$ and $TA_2$ are used to record analog audio signals. These analog audio signals are useful in locating desired portions of the magnetic tape for use in editing operations, such as so-called splice editing or electronic editing.

Magnetic tape 1 is illustrated as having a center line on either side of which are provided tracks TC and TT. Track TC is a control track adapted to have a control signal recorded therein. This control signal is illustrated in greater detail in FIG. 2B. Track TT is adapted to have a time code recorded therein.

Data tracks $TD_1$, $TD_2$, $TD_3$ and $TD_4$ are disposed, or sandwiched, between analog track $TA_1$ and control track TC. Similarly, data tracks $TD_5$, $TD_6$, $TD_7$ and $TD_8$ are disposed, or sandwiched, between time code track TT and analog track $TA_2$. It will be appreciated that the digitized information is recorded in each of the data tracks TD. In the illustrated example of ¼ inch tape, the digitized information may be recorded in any one of different formats. As an example, the formats described in application Ser. No. 286,963 may be used.

Turning now to FIGS. 2A-2C, there are illustrated a typical example of the digitized information that is recorded in a typical data track TD and a typical example of the control signal that is recorded in control track TC. FIG. 2B is a timing diagram representing the control signal; FIG. 2A is a timing diagram representative of the digitized information recorded in data blocks; and FIG. 2C is a schematic diagram representing a typical data block.

The control signal having the timing representation shown in FIG. 2B is recorded in control track TC for all formats. This control signal is comprised of a synchronizing signal positioned at the head, or beginning portion thereof (shown as the cross-hatched area in FIG. 2B), followed by a 16-bit control word formed of control data bits, followed by a 28-bit sector address formed of address bits, followed by a 16-bit error detecting code word, such as the cyclic redundancy code (CRC) word. Although the control signal shown in FIG. 2B is comprised of predetermined segments each formed of a preselected number of bits, it will be appreciated that, if desired, other segments may be used; and each of the illustrated segments may be formed of any desired number of bits capable of representing control data, sector addresses and error detecting codes. Furthermore, if desired, the synchronizing signal may be positioned at any other predetermined location in the control signal.

The term "sector" or "sector interval", as used herein, refers to a predetermined time interval which corresponds to a predetermined recording length, or interval, on the record medium. The sector interval is defined by the control signal illustrated in FIG. 2B. Successive control signals are recorded in successive, abutting sector intervals. As each control signal is recorded in a sector interval, the sector address is incremented by unity (i.e. by one bit). Hence, the sector address serves to identify the particular sector interval in which the control signal is recorded. The desired sector interval may be accessed merely by addressing the corresponding sector address. It is appreciated that $2^{28}$ successive sector intervals may be recorded on, for example, a length of magnetic tape; and the corresponding sector addresses will be incremented from one sector interval to the next so as to appear as, for example, [000...000], [000...001], [000...010], [000.011], and so on. As will be explained below, digitized information is recorded in the respective data tracks TD during each of the successive sector intervals.

The synchronizing signal is formed of a pattern which is distinct from any bit pattern included in the control word, sector address or CRC code of the control signal. Hence, this synchronizing pattern may be readily detected during a reproducing operation so as to identify the beginning of successive sector intervals. Also, this synchronizing pattern, when detected, may be used to synchronize the detection of the control word, sector address and CRC code of the control signal, and also may be used in a servo control circuit for controlling the tape drive during a reproducing operation.

The control word is adapted to represent control data for the purpose of identifying the particular format that is used to record the digitized information. For example, the control word may represent the sampling rate that has been used to digitize the analog signal, the number of tracks per channel in which each channel of digitized information is recorded, and other elements which constitute respective formats. For example, different encoding schemes may be used to encode the digitized information, and the control word may be used to identify the particular scheme which has been used. In addition to being encoded in a desired encoding scheme, the encoded digitized information also may be modulated prior to recording, and the control word identifies the type of modulation which is used. One example of a type of modulation that may be used is described in application Ser. No. 222,278, filed Jan. 2, 1981, the disclosure of which is incorporated herein by reference. In this modulator, the encoded digital signals are modulated so as to establish strict limitations on the minimum and maximum intervals between successive transitions, thereby avoiding distortion when the digitized signals are reproduced. Of course, other types of modulation may be used, such as the so-called 3PM type, or MFM type, or bi-phase modulation, as desired.

The sector address may be generated by, for example, a typical counter that is incremented in synchronism with the processing and recording of each sector interval. Preferably, the control data and the sector address data are used to produce an appropriate CRC code, or other error detecting code, from which the presence of an error in the control word and/or sector address may be detected upon reproduction. The formation of a CRC code and the manner in which it is used are known to those of ordinary skill in the art and, in the interest of brevity, further description thereof is not provided.

As will be described below, the control signal illustrated in FIG. 2B is subjected to FM modulation, and the FM-modulated control signal is then recorded in control track TC. Thus, regardless of the particular format which is used to record the digitized information, the FM-modulated control signal described hereinabove is common to such different formats.

FIG. 2A is a representative timing diagram illustrating the manner in which digitized information is recorded in a respective data track TD. As will be described below, cross-interleave error correction encoding is used, whereby successive samples of an input analog signal, such as an audio signal, are converted to corresponding digital information words, and these digital information words are used to produce error-correction words, such as parity words P. Then, a predetermined number of information words and parity words are time-interleaved to form sub-blocks, and a further error-correction word, such as a Q-parity word, is derived from the time-interleaved sub-block. Odd and even information words and their respective P-parity and Q-parity words are cross-interleaved to form a data block comprising, for example, twelve information words, four parity words and a error-detection word, such as a CRC code word, derived therefrom (FIG. 2C). A respective data block is preceded by a data synchronizing signal and, as illustrated in FIG. 2A, four successive data blocks are recorded in a sector interval. Of course, the data blocks may be modulated prior to recording, as described above. Successive data blocks are recorded in seriatum in a corresponding data track TD. During each sector interval, four succeeding data blocks are recorded, each data block being preceded by a data synchronizing signal.

Advantageously, the transducer, or head, used to record the control signal is in proper alignment with the recording heads used to record the information signal such that all of the data tracks are in alignment across the width of the magnetic medium, that is, all of the data synchronizing signals are in alignment, and the information signals also are in alignment with the control signal recorded in control track TC. That is, the synchronizing signal which is recorded at the head of the control signal is in alignment with the data synchronizing signals of each of the first data blocks recorded in a particular sector interval. Alternatively, the control signal recording head may be displaced from the information signal recording heads by a distance equal to an integral multiple of a sector interval.

The data synchronizing signal which precedes each data block (shown by the cross-hatched areas in FIGS. 2A and 2C) exhibits a pattern which is unique in that this pattern will not be exhibited by the information data included in the respective data blocks, even after modulation. The data synchronizing pattern is followed by a block address comprised of bits $B_0$–$B_2$. The block address $[B_2 B_1 B_0]$ identifies the particular position in a sector (i.e. in a group of four blocks) in which the data block is recorded. Preferably, the most significant bit $B_2$ of the block address is made equal to the least significant bit $S_0$ of the sector address of the particular sector in which the data block is recorded. With the block address comprised of three bits, it is appreciated that eight separate block positions may be represented thereby. Since four data blocks are recorded in a sector interval, and since the most significant block address bit $B_2$ is made equal to the least significant sector address bit $S_0$, it is appreciated that the block address $[B_2 B_1 B_0]$ is repeated every two sector intervals, but that portion of the block address $[B_1 B_0]$ is repeated at every sector interval.

FIG. 3 schematically illustrates one example of the recording transducers, or heads, which are used for recording digitized information in the respective data tracks, as well as for recording the control signal in control track TC of magnetic tape 1. The arrangement shown in FIG. 3 is particularly adapted to enable the information recorded in one track to be re-recorded in another track; and also to enable electronic editing, wherein information from a separate source, such as another record medium, is inserted into one or more desired data tracks at punch-in points. For the embodiment shown in FIG. 3, magnetic tape 1 is assumed to be driven in the direction indicated by the arrow.

The heads of FIG. 3 are comprised of a set of recording heads HR, a set of reproducing, or playback heads HP and another set of recording heads HR′. Each set of heads is comprised of aligned heads which are used for recording or reproducing information in respective data tracks TD, and also the control head for recording or reproducing the control signal in control track TC. Thus, recording heads HR actually are comprised of separate recording heads $HR_1$–$HR_8$ together with control signal recording head $HR_C$, all aligned across the width of tape 1. Likewise, additional recording heads HR′ actually are comprised of recording heads $HR'_1$–$HR'_8$ and control signal recording head $HR'_C$.

Recording heads HR are used to record original information in the respective data and control tracks of tape 1. For example, these heads may be used to form an original recording. The information recorded in these tracks are reproduced by associated ones of reproducing heads HP. When information recorded in one or more tracks is to be edited, that is, when this information is to be modified or replaced by additional information, recording heads HR′ are operated, selectively, to record such additional information in the appropriate tracks. For example, the digitized information recorded in track $TD_1$ may be edited by locating the desired punch-in point and then, when that punch-in point reaches recording head $HR'_1$, new information is recorded in data track $TD_1$. When the desired punch-out point is reached, recording head $HR'_1$ is disabled. Likewise, when information recorded in one channel, or one track, is to be re-recorded in another channel, or track, the information from the first channel, or track, is reproduced by appropriate ones of reproducing heads HP, and that reproduced information then is supplied to the desired ones of recording heads HR′ for re-recording in the appropriate tracks. The combination of heads HP and HR′ may be used for so-called "sync" recording wherein one channel is recorded while another channel is reproduced. It will be appreciated that, even when the foregoing edit operations or "sync" recording is carried out, the control track is not modified.

Typical examples of electronic editing which may be used with the arrangement of the transducers shown in FIG. 3 are described in U.S. application Ser. No. 116,401, filed Jan. 29, 1980, and also in U.S. Ser. No. 195,625, filed Oct. 9, 1980, both of these applications being incorporated herein by reference.

Turning now to FIG. 4, there is illustrated a block diagram of one embodiment of apparatus which may be used to record digitized information in a selected one of various different formats. This digitized information advantageously represents digital audio signals, such as PCM audio signals, which have been converted into digital form.

The illustrated recording apparatus is adapted to receive up to eight channels of digitized information, and to record the received channels of information in respective data tracks. Accordingly, the illustrated apparatus is provided with eight input terminals $2l \ldots 2h$, each adapted to receive a respective channel of digitized information CH1 . . . CH8, respectively. Input terminals $2a$–$2h$ are coupled to encoders $3a$–$3h$, respectively. Each encoder may be of the cross-interleaved error correction type described below.

The encoded digitized information produced by encoders $3a$–$3h$ are supplied to respective inputs of a demultiplexer 4. This demultiplexer is adapted to distribute the digitized information supplied to the respective inputs thereof to preselected outputs, depending upon the particular format which has been selected. In this regard, demultiplexer 4 is coupled to a control encoder 8 which, in turn, is coupled to an input terminal 7 to receive the format control signal.

In one embodiment the demultiplexer includes a set of switching circuits, the operation of which is controlled by a format designation signal produced by control encoder 8. For example, if the format control signal supplied to input terminal 7 identifies format A, the format designation signal produced by the control encoder controls the switching circuits of demultiplexer 4 such that the digitized information supplied to each input of the demultiplexer from encoders 3a-3h, respectively, is coupled to a corresponding respective output. That is, each channel of digitized information is distributed to only a single output of demultiplexer 4. If, however, the format control signal supplied to input terminal 7 identifies format B, demultiplexer 4 is controlled to distribute each channel of digitized information supplied to a respective input to two outputs. In this regard, only four channels (CH1-CH4) of digitized information are supplied to the illustrated recording apparatus, each channel being distributed to two respective outputs of the demultiplexer. Likewise, if the format control signal supplied to input terminal 7 identifies format C, the switching circuits of demultiplexer 4 are controlled such that each channel of digitized input information supplied to the demultiplexer is distributed to four respective outputs. When format C is adopted, it is appreciated that only two channels (CH1 and CH2) of digitized information are supplied to the illustrated recording apparatus.

In the foregoing description, it should be recognized that the digitized information supplied to each input of demultiplexer 4 is encoded in, preferably, the cross-interleaved error correction code by encoders 3a-3h, respectively. Thus, a particular input of the demultiplexer is supplied with consecutive data blocks of the type shown in FIGS. 2A and 2C, each data block having been formed in the manner described below.

The outputs of demultiplexer 4, which also may be referred to as a distributor circuit, are coupled to modulators 5a-5h, respectively. Each modulator may be of the type described in application Ser. No. 222,278. The outputs of modulators 5a-5h are coupled to data recording heads HR0-HR7 via recording amplifiers 6a-6h to recorded in data tracks TD0-TD7, respectively. Thus, each received channel of digitized information is recorded in the selected format on, for example, magnetic tape.

FIG. 4 also illustrates a control channel whereby the control signal shown in FIG. 2B is produced, modulated and recorded in a separate control track TC. The control channel is coupled to input terminal 7 and includes a control signal encoder 8 which, for example, includes a control word generator responsive to the format control signal to produce the aforementioned control word, an FM modulator 9, a recording amplifier 10 and control head $HR_C$. The control signal encoder also includes a synchronizing signal generator for generating the synchronizing pattern mentioned above with respect to FIG. 2B. In addition, the control signal encoder includes a sector address generator which, preferably includes a multi-bit binary counter, such as a 30-bit counter. Also included in control signal encoder 8 is a CRC word generator which may be of a conventional type and which is supplied with the generated control word and sector address to produce an appropriate CRC word.

The control signal produced by control encoder 8 is coupled to control recording head $HR_C$ via FM modulator 9 and recording amplifier 10. It is preferred to record the control signal as a frequency-modulated signal so as to facilitate the reproduction and detection thereof for all formats.

Although not shown in FIG. 4, each of the encoders 3a-3h includes a data synchronizing signal generator for generating the data synchronizing signal mentioned above with respect to FIGS. 2A and 2B. Furthermore, each encoder is adapted to supply the block address $[B_2B_1B_0]$ for identifying the particular blocks which are recorded in each sector interval in each data track. This block address is derived from, for example, the three least significant bits included in the 30-bit counter of encoder 8. Thus, this 30-bit counter may be incremented in synchronism with the generation, or formation, of each data block produced by encoders 3a-3h. It is appreciated that, after four data blocks have been generated, the two least significant bits of the 30-bit counter repeat their cycle. Likewise, after eight data blocks have been generated, the three least significant bits of the 30-bit counter are repeated. Hence, the aforementioned block and sector addresses are generated by this 30-bit counter.

Referring now to FIG. 5, there is illustrated a block diagram of reproducing apparatus for reproducing the digitized information from respective tracks of the record medium, which apparatus is compatible with any one of the particular formats which may be used to record that information. This embodiment of the data reproducing apparatus is comprised of reproducing heads HP0-HP7 adapted to reproduce the digitized information which had been recorded in data tracks TD0-TD7, respectively. Heads HP0-HP7 are coupled to demodulators 15a-15h via playback amplifiers 11a-11h and clock signal extracting circuits 13a-13h, respectively. Each clock signal extracting circuit includes a phase-locked loop for generating a clock signal of desired repetition rate, which phase-locked loop is synchronized with, for example, the bit timing rate, or phase, of the reproduced digital signals. The synchronizing pattern recorded in the respective data tracks at the head of each data block may be used to synchronize the phase-locked loop. Hence, the bit timing, or clock signals, are extracted from the data which is reproduced from each track.

Each demodulator is adapted to be compatible with the particular type of modulation which had been used to record the digitized information. Demodulators 15a-15h are coupled to respective inputs of a multiplexer 16 via time base correctors 17l-17h, respectively. Multiplexer 16 is controlled by a suitable control decoder 19, this decoder serving to decode the format identification signal for establishing the appropriate switching sequences for the multiplexer. The outputs of multiplexer 16 are coupled to decoders 20a-20h, respectively, which decoders may be of the type described below, adapted to decode the preferred cross-interleaved error correction code which had been used to record the digitized information. The outputs of decoders 20a-20h are coupled to output terminals 21a-21h, respectively, so as to recover the original channels of digitized information CH1-CH8, respectively.

The reproducing apparatus shown in FIG. 5 also includes a control channel adapted to recover the control signal (FIG. 2B) which had been recorded in control track TC. In this regard, the control channel includes a control reproducing head HP$_C$ coupled to an FM demodulator 18 via a playback amplifier 12 and a clock signal extracting circuit 14. This clock signal extracting circuit may be similar to any one of aforedescribed clock signal extracting circuits 13a–13h. The FM demodulator is adapted to demodulate the control signal which had been frequency modulated prior to recording. This demodulated control signal then is supplied to an error-detecting circuit (not shown), such as a CRC check circuit, which operates in a known manner in response to the CRC code word included in the control signal for the purpose of detecting whether an error is present in the control signal. That is, the CRC check circuit detects whether the control word or the sector address contains an error. If no error is detected, a decoder 19 operates to recover the control word, the sector address and the synchronizing pattern included in the control signal. However, if an error is detected in the reproduced control signal, an immediately preceding control word, which had been stored to account for the possibility that the next-following control signal may be erroneous, is used. In this regard, a delay circuit having a time delay equal to one sector interval may be provided in, for example, decoder 19.

The recovered control word establishes the particular switching arrangement for multiplexer 16, by which the digitized information which is reproduced from data tracks TD$_0$–TD$_7$ is re-distributed, or re-formed, back to the proper channels.

Preferably, the reproducing apparatus illustrated in FIG. 5 recovers the original digitized information, which information then is supplied to suitable converting circuitry for converting the digital signals back to their original analog form. For example, if the illustrated apparatus is used as a so-called PCM audio recorder, the digitized information produced at the outputs of decoders 20a–20h is the form of PCM signals, and each PCM signal is converted into a corresponding analog level so as to re-form the original analog audio signal.

Decoder 19 also recovers the control synchronizing signal and the sector address included in each reproduced control signal. This control synchronizing signal, which exhibits a repetition rate determined by the sector interval, is supplied to a servo circuit for the tape-drive capstan to effect control over that capstan such that the record tape is driven uniformly for the reproducing operation. The sector address is used to identify a particular sector interval in which a desired data block is recorded, thereby enabling precise punch-in and punch-out points to be accessed for an edit operation. The sector address also may be used to locate desired data recorded in any one or more of data tracks TD$_0$–TD$_7$.

Each of time base correctors 17a–17h is adapted to correct time base errors which may be introduced into the digitized information in one or more data tracks during reproduction. Such time base errors may be due to tape jitter, expansion (or contraction) of the tape after data has been recorded thereon, or a disturbance in the normal synchronous relationship between the data and control tracks due to, for example, editing of only one (or less than all) channel. Each time base corrector preferably includes an addressable memory device, such as a random access memory (RAM) whose capacity is at least equal to a sector interval (i.e. four data blocks) and, desirably, has a memory capacity adequate to account for maximum time base variations that may be expected. Typically, a memory capacity capable of storing eight data blocks is sufficient.

Each data block is written into the RAM of a respective time base corrector, word-by-word, in response to the extracted clock signal derived from the reproduced signal. Hence, the reproduced data is written into the RAM in synchronism with the time base variations that may be present in the reproduced signals. The time base correctors are coupled in common to a read clock which generates a read clock signal of fixed, reference frequency. Accordingly, each data block is read out of the RAM at a constant reference rate, thereby eliminating therefrom the time base variations that may have been present during reproduction. A more detailed description of the time base corrector used herein is set out below.

Decoders 20a–20h, described more fully below, include CRC check circuits to detect if an error is present in each data block applied thereto, de-interleaving circuits to de-interleave the digital words which constitute the respective data blocks, error-correction circuits to correct errors that may be present in the de-interleaved words, and interpolating circuits to compensate, or conceal, those errors which may not be correctable. The resultant data words produced at output terminals 21a–21h may be PCM audio signals which are converted into analog form by digital-to-analog converters (not shown) coupled to such output terminals.

Referring now to FIG. 6, there is illustrated a block diagram of one embodiment of a time-interleaved error correction encoder which may be used as each of encoders 3a–3h. This encoder is comprised of an even-/odd distributing circuit 23, parity word generators 241, 242, time-interleaving circuits 24A, 24B, parity word generators 251, 252, further time-interleaving circuits 25A, 25B, a delay circuit 27, a synthesis circuit 26 and a CRC code generator 28. An input terminal 22 supplies successive information words, such as PCM words W$_1$, W$_2$, W$_3$, W$_4$ . . . to even/odd distributing circuit 23, whereat the odd information words are separated from the even information words. As one example thereof, even/odd distributing circuit 23 includes an upper group of six output terminals whereat odd information words are provided and a lower group of six output terminals whereat the even information words are provided. Thus, if, for example, twelve PCM words are supplied sequentially to input terminal 22, the six even information words, such as W$_2$, W$_4$, Ew$_6$, W$_8$, W$_{10}$ and W$_{12}$ are provided at the lower group of output terminals of distributing circuit 23, and concurrently the six odd information words, such as W$_1$, W$_3$, W$_5$, W$_7$, W$_9$ and W$_{11}$ are provided at the upper group of output terminals. It will be appreciated that these respective information words are included in data series which may be represented as:

$$W_{(1)} = W_1, W_{13}, W_{25}, \ldots$$
$$W_{(3)} = W_3, W_{15}, W_{27}, \ldots$$
$$\vdots$$
$$W_{(11)} = W_{11}, W_{23}, W_{35}, \ldots$$
$$W_{(2)} = W_2, W_{14}, W_{26}, \ldots$$
$$W_{(4)} = W_4, W_{16}, W_{28}, \ldots$$
$$\vdots$$
$$W_{(12)} = W_{12}, W_{24}, W_{36}, \ldots$$

Parity word generator 241 is comprised of an exclusive-OR circuit, or modulo-2 adder, and is supplied with the odd information words $W_1 \ldots W_{11}$ to produce a parity word $P_1$ therefrom. This parity word is represented as a P-parity word, and parity word generator 241 generates a sequence of P-parity words in response to every group of six odd information words supplied by distributing circuit 23. Similarly, parity word generator 242 is comprised of an exclusive-OR circuit, or modulo-2 adder, supplied with the even information words $W_2 \ldots W_{12}$ to produce a parity word $P_2$ therefrom. It is appreciated that $P_1 = W_1 \oplus W_3 \oplus W_5 \oplus W_7 \oplus W_9 \oplus W_{11}$, and $P_2 = W_2 \oplus W_4 \oplus W_6 \oplus W_8 \oplus W_{10} \oplus W_{12}$. The odd information words together with the odd P-parity word $P_1$ comprise an odd P sub-block. Likewise, the even information words together with the even P-parity word comprise an even sub-block. The respective data words, i.e. the information and parity words, of each P sub-block are interleaved by delay circuits 24A and 24B. That is, odd information word $W_1$ is not delayed, odd information word $W_3$ is delayed by d time units in delay circuit 24A, word $W_5$ is delayed by 2d time units, P-parity word $P_1$ is delayed by 3d time units and words $W_7$, $W_9$ and $W_{11}$ are delayed by 5d, 6d and 7d time units, respectively, thus producing delayed words $W'_3$, $W'_5$, $P'_1$, $W'_7$, $W'_9$ and $W'_{11}$. Similarly, even information word $W_2$ is not delayed, even information word $W_4$ is delayed by d time units in delay circuit 25B, word $W_6$ is delayed by 2d time units, P-parity word $P_2$ is delayed by 3d time units and words $W_8$, $W_{10}$ and $W_{12}$ are delayed by 5d, 6d and 7d time units, respectively, thereby producing delayed words $W'_4$, $W'_6$, $P'_2$, $W'_8$, $W'_{10}$ and $W'_{12}$. Thus, the data words in each P sub-block are selectively delayed so as to form an interleaved P sub-block.

Each interleaved P sub-block is further encoded, and another parity word is generated in response to each data word that comprises the interleaved P sub-block. More particularly, another parity word generator 251, diagrammatically represented as an exclusive-OR circuit, or modulo-2-adder, receives the interleaved data words included in the odd P sub-block to produce a Q-parity word in response thereto. This Q-parity word is represented as $Q_1$. Likewise, a Q-parity word generator 252 generates a Q-parity word $Q_2$ in response to the interleaved data words included in the even P sub-block. The interleaved words of the odd P sub-block, together with the odd Q-parity word generated in response thereto, comprises an odd Q sub-block, the words of this Q sub-block being interleaved by selectively delaying each word. Likewise, the words of the even interleaved P sub-block, together with the Q-parity word generated in response thereto, comprise an even Q sub-block. The words of the even Q sub-block are interleaved by selectively delaying such words. More particularly, in the odd Q sub-block, odd information word $W_1$ is not delayed. Odd information word $W_3$ is delayed by $(D-d)$ time units in delay circuit 25A, thus providing odd information word $W'''_3$. Information word $W'_5$ is delayed by $2(D-d)$ time units to provide the delayed information word $W'''_5$. Parity word $P'_1$ is delayed by $3(D-d)$ time units, parity word $Q_1$ is delayed by $4(D-d)$ time units, and information words $W'_7$, $W'_9$ and $W'_{11}$ are delayed by $5(D-d)$, $6(D-d)$ and $7(D-d)$ time units, respectively. These selectively delayed words of the odd Q sub-block thus are interleaved, resulting in an odd interleaved Q sub-block comprised of $[W_1 W'''_3 W'''_5 P'_1 Q'_1 W'''_7 W'''_9 W'''_{11}]$. In a similar manner, delay circuit 25B selectively delays the words of the even Q sub-block to produce an interleaved Q sub-block comprised of $[W_2 W'''_4 W'''_6 P'''_2 Q'_2 W'''_8 W'''_{10} W'''_{12}]$.

In the delay circuits 24A, 24B, 25A, 25B, the time units d and D which produce the desired time-interleaving of information and parity words are selected such that the least common multiple of d and $(D-d)$ exceed 7D. As an example, $d=2$ data blocks (i.e. the amount of time needed to receive or record a data block) and $D=17$ data blocks.

The interleaved even Q sub-block produce by delay circuit 25B is subjected to a further delay of K time units in delay circuit 27. This further delay disperses the even data words with respect to the odd data words and as described in Ser. No. 195,625, overcomes pronounced errors due to splice edit points. As an example, $K > D > d$.

Figures 7, 8:
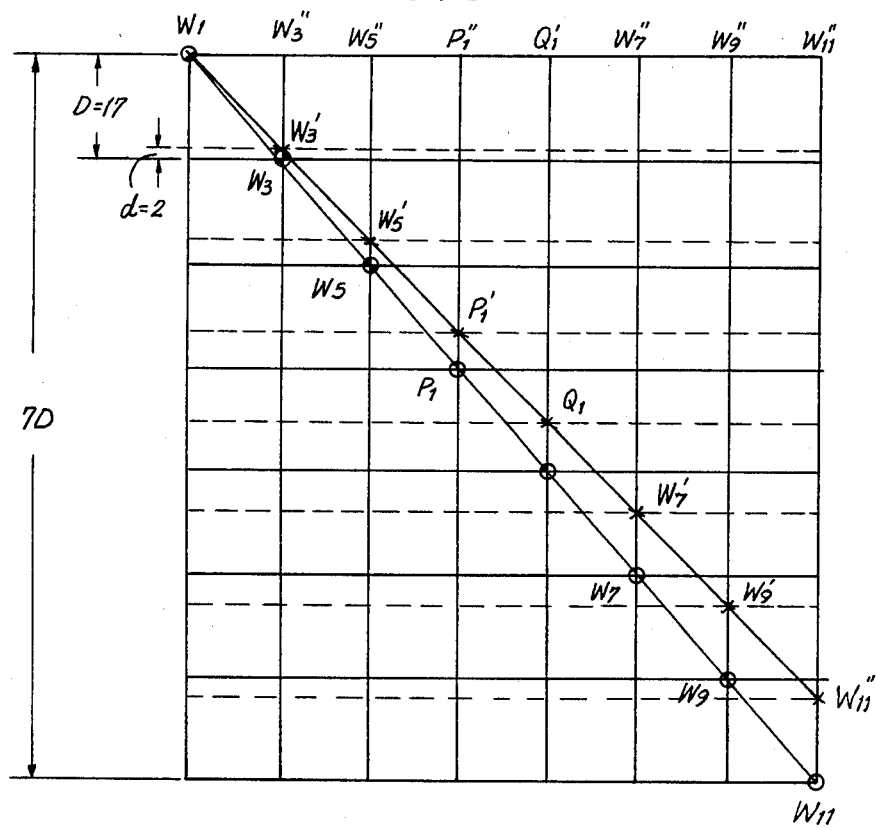
FIG. 7 represents a typical time-interleaved data block which is recorded by the encoder shown in FIG. 6.
FIG. 8 is a graphical representation of the time-interleaving effect achieved by the encoder shown in FIG. 6.

Each interleaved Q sub-block is comprised of six information words and two parity words, a P-parity word and a Q-parity word. The respective data words in each Q sub-block are seen to be interleaved, that is, they are derived from time-displaced words. The odd and even interleaved Q sub-blocks (the latter being further delayed by K time units) are synthesized to form a data block by synthesizer 26, and this data block is supplied, serially by word, to error detecting code generator 28, shown in FIG. 6 as a CRC word generator. Thus, the interleaved information and error-correction (e.g. parity) words, are used to form a cyclic redundancy check code word. This CRC word, together with the interleaved words which constitute the odd and even Q sub-blocks are combined with a synchronizing word (not shown) to form one complete data block. This data block is provided at output terminal 29 and may be represented as shown in FIG. 7. It is appreciated that this arrangement, and particularly the location of the parity words in the central portion of the data block, is a preferred but not essential arrangement, and is formed by synthesizer 26. Successive data blocks in respective channels are supplied to demultiplexer 4 of FIG. 4.

From FIG. 7 it is seen that successive odd-numbered (and even-numbered) information words are spaced from each other by a maximum distance. Thus, successive odd-numbered information words $W_1$ and $W_3$ are seen to be separated by the maximum distance which can be accommodated by the data block. Likewise, successive even-numbered information words $W_2$ and $W'''_4$ are separated by this maximum distance. This cross-interleaved error-correction encoding technique facilitates the correction of what otherwise would be considered to be "uncorrectable" errors wherein successive information words are obliterated.

FIG. 8 is a graphical representation of the time intereleaved relationship of the data words which constitute a typical Q sub-block. The solid inclined line which passes through the circles may represent the original, distributed odd information words $W_1 \ldots W_{11}$, and also the P-parity word $P_1$ formed therefrom. These words are delayed by respective amounts (d . . . 7d) in delay circuit 24A to produce delayed words $W'_3 W'_5 P'_1 W'_7 W'_9 W'_{11}$. Such delayed words comprise the P sub-block which is represented by the inclined line that passes through the crosses ("x"). The relative delay imparted to these words by delay circuits 24A is represented by the broken horizontal lines. Finally, the data words included in the P sub-block, as well as the Q-parity word generated therefrom, are respectively delayed by delay circuits 25A to produce delayed words $W'''_3 W'''_5 P''_1 Q'_1 W''_7 W''_9 W''_{11}$ which comprise the Q sub-block that is represented by the top-most horizontal line. It will be appreciated that information words $W_1$ and $W'''_1$ are included in the same Q sub-block (and also in the same data block) but are time-separated from each other (which is equal to the time separation between $W_{11}$ and $W''_{11}$) by 7D=119 time units. Thus, these words are sufficiently dispersed.

Figure 9:
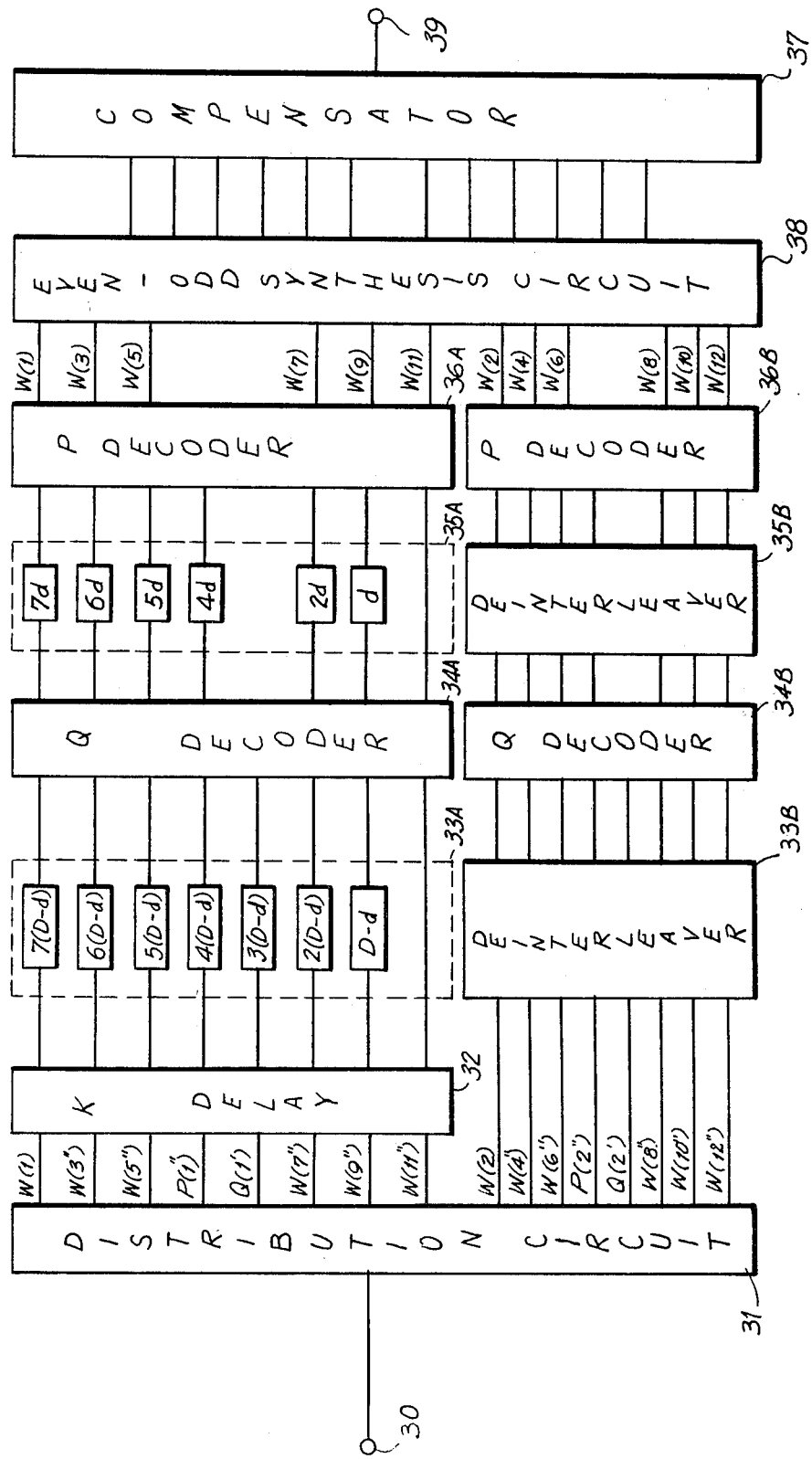
FIG. 9 is a block diagram of a time-interleaved error correction decoder that is compatible with the encoder shown in FIG. 6.

One embodiment of decoding circuitry which may be used as each of decoders 20a–20h to recover the information words which are recorded in the encoded form produced by the apparatus shown in FIG. 6 is illustrated in FIG. 9. This apparatus is comprised of a distribution circuit 31, a delay circuit 32, de-interleaving time delay circuits 33A, 33B, error correction decoders 34A, 34B, de-interleaving time delay circuits 35A, 35B, error correction decoders 36A, 36B, a synthesis circuit 38 and a concealing, or compensating, circuit 37. The data blocks which are recorded serially-by-word are reproduced, and after passing through the reproducing circuitry shown in FIG. 5 are supplied from an input terminal 30 to distribution circuit 31. This circuit provides the even interleaved Q sub-block, comprised of even information words $W_2 W'''_4 W'''_6 W'''_8 W'''_{10} W'''_{12}$, P-parity word $P''_2$ and Q-parity word $Q'_2$ parallel-by-word to de-interleaving time delay circuit 33B; and provides the odd intereleaved Q sub-block, comprised of odd information words $W_1 W'''_3 W'''_5 W'''_7 W'''_9 W'''_{11}$ together with odd P-parity word $P''_1$ and odd Q-parity word $Q''_1$ parallel-by-word to delay circuit 32.

Although not shown, all of these data words are supplied to a CRC check circuit prior to distribution circuit 31 whereat an error in the reproduced data block is detected. If an error in the data block is detected, a respective error flag associated with each of the data words is set and may be used by the error correction decoders as an indication of which data words should be corrected.

It will be recognized that the interleaved data words which comprise the odd Q sub-block are selectively delayed by time delay circuits 32, 33A and 35A in a manner complementary to the time delays of the encoder (FIG. 6) so as to de-interleave these data words. That is, the delays imparted by delay circuits of the decoder (FIG. 9) are inversely related to the delays imparted by the delay circuits in the error correcting encoder. Thus, delay circuit 32 cancels the relative delay between the odd and even Q sub-blocks, and the odd information word $W_1$, which had undergone no delay in the encoder, is subjected to the greatest delay 7(D−d) in delay circuit 33A. The odd information word $W'''_3$ is subjected to a delay of 6(D−d) and so on, with odd information word $W''_{11}$ being subjected to no delay. The parity words also are subjected to delays in the decoder which are inversely related to the delays imparted thereto in the encoder. Thus, delay circuit 33A serves to de-interleave the data words which comprise the odd Q sub-block. Such de-interleaved data words are supplied to Q-parity decoder 34A and exhibit substantially the same time alignment as was exhibited by the data words that had been supplied to parity word generator 251 in the encoder.

Likewise, delay circuits 33B serve the same function as delay circuits 33A, that is, to de-interleave the data words which comprise the even Q sub-block. These de-interleaved data words, comprised of the even information word, the even P-parity word and the even Q-party word, are supplied to Q-parity decoder 34B in substantially the same time alignment as was exhibited by the data words that were supplied to Q-parity word generator 252 in the encoder.

The respective Q-parity decoders carry out an error-correction decoding operation to correct those erroneous data words whose associated error flag signals are set.

It is possible that the data words in the Q sub-blocks supplied to Q-parity decoders 34A and 34B may contain errors which exceed the error correcting ability of the parity decoders. In that event, one or more of the data words produced at the output of the even or odd Q-parity decoder may remain uncorrected. It is appreciated that the data words which are produced at the output of the Q-parity decoder constitute an interleaved P sub-block. Thus, the data words produced at the output of Q-parity decoder 34A constitute an odd interleaved P sub-block; and the data words produced at the outputs of Q-parity decoder 34B constitute an even interleaved P sub-block. One or more of the data words in each of these interleaved P sub-blocks may be erroneous, that is, such words may not have been corrected by the Q-parity decoder. The interleaved data words in the odd P sub-block are de-interleaved by delay circuits 35A. These delay circuits impart delays of 7d, 6d, ... 2d and d, respectively, and are inversely related to the delay circuits 24A used in the error correcting encoder. Hence, the odd information words, as well as the odd P-parity word, which are supplied to P-parity decoder 36A all are in time alignment and are constituted by the words $W_1 W_3 W_5 W_7 W_9 W_{11}$ and $P_1$. It is recalled that these odd information and P-parity words constitute the odd P sub-block.

P-parity decoder 36A functions in a manner similar to Q-parity decoder 34A. Accordingly, those information words whose associated error flag signals are set are corrected. When an erroneous information word is corrected, its associated error flag signal is reset.

A similar de-interleaving operation is carried out on the even P sub-block by delay circuits 35B, and a similar error correction operation is carried out by P-parity decoder 36B. Thus, the de-interleaved even P sub-block is supplied to this even P-parity decoder, and those information words which have been detected as being erroneous are corrected. Furthermore, the error flag which is associated with the erroneous odd information word is reset.

Even/odd synthesis circuit 38 re-arranges the de-interleaved, corrected information words in successive order, that is, in the order $W_1 W_2 \ldots W_{11} W_{12}$. These rearranged, corrected information words are supplied to error compensating circuit 37, which may include an interpolator circuit, whereat uncorrected information words are compensated by interpolation. That is, if, for example, even information word $W_4$ remains uncorrected, as indicated by its associated error flag signal which has not been reset, an approximate value of this word is obtained by interpolating adjacent odd information words $W_3$ and $W_5$.

Referring now to FIG. 10, there is illustrated a block diagram of a preferred embodiment of a time base corrector which can be used as each of the base time correctors 17a–17h in the reproducing section shown in FIG. 5. This preferred embodiment of the time base corrector is comprised of a memory 40, such as an addressable random access memory, a write address generator 45W, 46W, 51, a read address generator 45R, 46R, a write control circuit 43, 50 and an error flag memory 52. RAM 40 preferably is provided with a sufficient number of addressable storage locations, each of which being adapted to store a data block and, more particularly, to store the sixteen data words and CRC word included in a data block. Eight such addressable storage locations is sufficient to account for expected jitter in the reproduced digital signals. As illustrated, RAM 40 includes an input terminal adapted to be supplied with the data blocks, a write enable terminal adapted to be supplied with the write enable signal $\overline{WE}$, an output terminal, and write-in and read-out address terminals adapted to receive write-in and read-out addresses, respectively. The input terminal of RAM 40 is coupled to a delay circuit 42 which is adapted to receive a demodulated data block WDT supplied thereto from input terminal 41. The delay circuit serves to delay this data block by approximately one data block duration and to supply the delayed data block WDT' to the input terminal of RAM 40. The delayed data block WDT' also is supplied to a read only memory (ROM) 51, for a purpose soon to be described.

The write enable terminal of RAM 40 is coupled to a D-type flip-flop circuit 50, included in the write control circuit, and is adapted to receive the write enable signal $\overline{WE}$. The D-type flip-flop circuit includes a data input D coupled to a CRC check circuit 43 for receiving an error detecting signal EDT. CRC check circuit 43 is, in turn, coupled to input terminal 41 to receive the demodulated data blocks. It is appreciated that CRC check circuit 43 may be of a type known to those of ordinary skill in the art for detecting the presence of an error in the reproduced data block. In particular, the CRC check circuit is responsive to the CRC code word included in each data block (FIG. 2C) to detect the presence of an error therein. If an error is detected, error detect signal EDT is a binary "1".

D-type flip-flop circuit 50 also is coupled to a delay circuit 49 for receiving a synchronizing pulse PSY' therefrom, which synchronizing pulse PSY' serves to trigger the flip-flop circuit to assume a state determined by the state of the error detect signal EDT. Delay circuit 49 is coupled to an input terminal 48 which is supplied with a synchronizing pulse PSY that is derived from the synchronizing signal included at the head of each data block, as shown in FIG. 2C. The purpose of delay circuit 49 is to provide proper time alignment between the delayed synchronizing pulse PSY' and the delayed data block WDT', as will be described.

The write enable signal $\overline{WE}$ produced by flip-flop circuit 50 is coupled, in addition to the write enable terminal of RAM 40, to a selector circuit 44, and to an error flag memory controller 55. As will be explained below, if the write enable signal $\overline{WE}$ is a binary "0", as will occur when CRC check circuit 43 detects the absence of an error in the reproduced data block, selector 44 supplies a write-in address to the RAM. Also, when the write enable signal $\overline{WE}$ is a binary "0", multiplexer 53 is controlled to supply a binary "0" to error flag memory 52. Conversely, if the write enable signal $\overline{WE}$ is a binary "1", multiplexer 53 is controlled to supply a binary "1" to the error flag memory.

The write address generator is comprised of a bit counter 45W, a block counter 46W and ROM 51. Bit counter 45W may comprise a conventional counting circuit coupled to a bit clock terminal 47W which is supplied with clock pulses synchronized with the bit repetition rate of the received data blocks. It is appreciated that the clock pulses supplied to bit clock terminal 47W may be derived from the clock extracting circuit described above with respect to FIG. 5. Bit counter 45W additionally includes a clear input CL coupled to delay circuit 49 to receive the delayed synchronizing pulse PSY' so as to clear the contents of the bit counter. Thus, bit counter 45W is reset in response to each delayed synchronizing pulse PSY', and thereafter the count thereof is incremented in response to each bit clock pulse supplied to bit clock terminal 47W. The instantaneous count of bit counter 45W is supplied from its output terminal OUT to selector 44 to establish the bit write-in address for RAM 40. This count, referred to as the write bit count, also is supplied to controller 55 for a purpose to be described.

Block counter 46W may comprise a presettable counter, or register, adapted to be preset with a write-in address WA supplied thereto by ROM 51. The block counter is triggered, or actuated, in response to the delayed synchronizing pulse PSY' supplied to its load input LD. Thus, when actuated, block counter 46W stores the write-in address WA then produced by ROM 51 until a subsequent delayed synchronizing pulse PSY' is generated. The write-in address WA stored in block counter 46W is supplied from its output terminal OUT to selector 44 so as to determine, or identify, the particular storage location in RAM 40 in which a data block is to be written, This write-in address WA also is supplied to controller 55. It is appreciated, therefore, that the write-in address WA selects the particular storage location in RAM 40 in which an incoming data block is to be written; and the bit count generated by bit counter 45W identifies each bit location in the addressed storage location that receives a respective bit of the incoming data block. Thus, each bit of that data block is written into a corresponding bit location in the addressed storage location of RAM 40.

The read address generator is comprised of read bit counter 45R and read block counter 46R. The read bit counter is similar to aforedescribed write bit counter 45W and includes a clear input CL coupled to receive a reset pulse that may be generated periodically from a suitable thiming control circuit (not shown). Read bit counter 45R also includes a clock pulse input coupled to read bit clock terminal 47R$_1$. Read bit pulses are supplied to this read bit clock terminal from a reference clock generator whose clock pulses exhibit a substantially fixed frequency. The instantaneous count of the read bit counter is coupled to selector 44 from the output terminal OUT thereof. Thus, read bit counter 45R generates successive bit addresses which identify the particular bit location in a read-out addressed storage location of RAM 40 from which a data block stored in that storage location is read.

Read block counter 46R may be similar to read bit counter 45R; and includes a clock input coupled to a read block clock terminal 47R$_2$ which is supplied with reference pulses having a repetition rate equal to the rate at which successive data blocks are read out from RAM 40. The read block clock pulses may be generated from the same timing control circuit that is used to supply the reset and read bit clock pulses mentioned above. As an example, read block counter 46R may be a 3-bit counter adapted to count from 0 to 7, and then to repeat this count. Hence, successive storage locations 0, 1, 2, . . . 7 in RAM 40 are addressed by read block counter 46R to read out the data blocks stored in those locations from the RAM. The read-out address RA generated by read block counter 46R also is supplied to controller 55, as is the read bit address generated by read bit counter 45R. Also, the read-out address RA is coupled from read block counter 46R to ROM 51.

ROM 51 is supplied with delayed data block WDT' and is adapted to utilize the block address contained in that data block. Alternatively, suitable gating circuitry may be provided so as to supply ROM 51 only with the 3-bit block address included in each delayed data block WDT'. Thus, ROM 51 is supplied with a block address $[B_2B_1B_0]$ and the instantaneous read-out address RA then generated by read block counter 46R. The ROM includes a plurality of addressable storage locations, each of which stores a write-in address WA, and each of which is addressed, or selected, by the combination of the block address included in delayed data block WDT' and the read-out address RA. FIG. 12 is a representation of a suitable memory map which represents the write-in address WA which is selected in response to the block and read-out addresses supplied to ROM 51. For convenience, the read-out address RA is represented in decimal form 0, 1 . . . 7, and the block address BA also is represented in decimal form corresponding to the two least significant bits thereof which, it is recalled, repeat 0, 1, 2, 3, 0, 1, 2, 3, . . . at each sector interval. Thus, depending upon the particular read-out address than being generated and the particular block address BA then being received, an appropriate write-in address WA is generated by ROM 51.

Error flag memory 52 preferably comprises a memory device having a plurality of storage compartments, each storage compartment being associated with a respective storage location in RAM 40. As one example, if RAM 40 includes eight separate addressable storage locations, error flag memory 52 may comprise an 8-stage addressable register, each stage being associated with a respective addressable storage location in the RAM. An input terminal of the error flag memory is coupled to multiplexer 53 which, as described above, supplies either a binary "0" or a binary "1" to the error flag memory, depending upon whether the write enable signal $\overline{WE}$ is a binary "0" or a binary "1", respectively. Multiplexer 53 may be comprised of a switching circuit having respective inputs coupled to voltage sources corresponding to binary "0" and "1" levels, respectively. Alternatively, the multiplexer may comprise a flip-flop circuit whose state is determined by controller 55 in response to the condition of the write enable signal $\overline{WE}$ supplied to the controller. Regardless of the actual construction of multiplexer 53, a binary "0" or "1" is supplied as an error signal, or error flag, to error flag memory 52. It is appreciated that this error signal, or flag, is indicative of whether an error has been detected in the received data block which, of course, is determined by the state of the write enable signal $\overline{WE}$.

As mentioned above, controller 55 is supplied with the write-in address WA generated by block counter 46W, the write bit address generated by write bit counter 45W, the write enable signal $\overline{WE}$, the read address RA generated by block counter 46R and the read bit address generated by read bit counter 45R. Controller 55, which may comprise suitable gating circuitry, selects the particular storage compartment in error flag memory 52 that is associated with the storage location in RAM 40 in which a data block then is being written. That is, controller 55 selects the particular storage compartment in the error flag memory which is identified by the write-in address WA then supplied to the controller by block counter 46W. Controller 55 also is responsive to the write enable signal $\overline{WE}$, when the latter is a binary "0", to control multiplexer 53 to supply a binary "0" error flag for writing into the storage compartment then being identified by write-in address WA. Preferably, to avoid storing an erroneous error flag when a spurious pulse is falsely identified as a synchronizing pulse PSY, the error flag write operation is carried out when a predetermined bit of the incoming data block is written into RAM 40. In particular, the error flag write operation is carried out when substantially the last bit of the data block is written into the RAM. Accordingly, controller 55 may include a detector adapted to detect when the count of write bit counter 45W reaches a maximum count value corresponding to this last bit. Of course, if desired, any predetermined bit count address may be detected by controller 55, whereupon the error flag supplied to error flag memory 52 by multiplexer 53 is written into the storage compartment then addressed by write-in address WA.

Controller 55 also is adapted to select, for a read-out operation, the storage compartment in error flag memory 52 which is associated with that storage location in RAM 40 whose contents then are being read out therefrom. To this effect, the read-out address RA generated by block counter 46R is utilized by the controller to select the addressed storage compartment in error flag memory 52 from which the error flag stored therein is read out. This read out error flag is supplied to latch circuit 54 wherein it is temporarily stored as the error flag signal EFLG. Controller 55 supplies a latch pulse to latch circuit 54 at a predetermined time. Preferably, latch circuit 54 is "latched" to store the error flag then read out from error flag memory 52 when substantially the first bit of a data block is read out from the read-out addressed location of RAM 40. Hence, the controller may include another detecting circuit adapted to detect when the bit count of bit counter 45R is a predetermined count value, for example, when this read bit count represents the first bit of the read out data block. Thereafter, that is, after the error flag is read out from the addressed storage compartment of error flag memory 52, the contents of this addressed storage compartment is set to a binary "1". It will be appreciated, therefore, that notwithstanding the actual state of the error flag then read out from the error flag memory, this error flag is forced to its binary "1" condition.

The manner in which the time base corrector shown in FIG. 10 operates now will be described with reference to the timing diagrams shown in FIGS. 11 and 13. It is recalled that, during each sector interval, four data blocks are recorded. Hence, during the interval required to reproduce the control signal shown in FIG. 2B, four successive data blocks WDT are reproduced. The synchronizing signal included in each control signal is used to generate a periodic capstan control signal shown in FIG. 11A. Thus, and as shown in FIG. 11B, during each period of the capstan control signal, data blocks containing block addresses BA 0, 1, 2, 3 are reproduced. The recurring block addresses are supplied to ROM 51.

FIG. 11C represents the recurring read addresses RA which are generated by block counter 46R of the read address generator. Since block counter 46R is supplied with a block clock signal of fixed reference frequency, it will be recognized that the read-out address RA is incremented from 0 to 7 periodically, as shown. The timing relationship of FIGS. 11A–11C indicates that the data blocks are reproduced with little or no jitter.

The read-out address RA is supplied to ROM 51. From the memory map table shown in FIG. 12, ROM 51 generates write-in addresses WA in response to the block address BA then received thereby as well as from the read-out address RA then generated by block counter 46R. Consequently, ROM 51 generates the write-in addresses WA shown in FIG. 11D. These successive write-in addresses WA are supplied to block counter 46W included in the write address generator.

Turning to FIG. 13A, successive data blocks WDT supplied to input terminal 41 of the time base corrector are illustrated. As an example, FIG. 13A illustrates data block containing block address BA[1] followed by the data block address BA[2]. Each received data block is supplied to CRC check circuit 43 which operates to detect the presence of an error in that data block. CRC check circuit 43 operates in response to the CRC code word included in each data block and, based upon that CRC code word, functions to determine if the data block contains an error. Thus, if an error is present in, for example, the block address BA included in that data block, or if an error is present in the information or parity words included in that data block (which words are generally referred to in FIG. 13 as "data"), CRC check circuit 43 generates an error detecting signal EDT which is a binary "1". Conversely, if no error is detected in the received data block, CRC check circuit 43 generates a binary "0" error detect signal EDT. FIG. 13B represents the time of occurrence of each error detect signal EDT with respect to the received data blocks. These error detect signals are shown in broken lines to represent that they may be either a binary "1" or a binary "0". It is appreciated that the error detect signal EDT is produced after an entire data block has been received. That is, the error detect signal EDT is generated in coincidence with the beginning of the next-following data block. Accordingly, in order to provide proper time alignment between the received data blocks and the error detect signals EDT generated therefrom, the received data blocks are delayed by a time interval which is approximately equal to a data block interval by delay circuit 42. The delayed data blocks WDT' are illustrated in FIG. 13C. Thus, it is recognized that the error detect signal EDT which had been produced immediately following the reception of the data block containing block address BA[0] substantially coincides in time with this block address. Likewise, the error detect signal EDT which had been produced for the data block containing block address BA[1] now coincides in time with the block address portion of this data block.

FIG. 13D illustrates the synchronizing pulse PSY which is supplied to input terminal 48 in response to the detection of each synchronizing pattern SYNC included in each received data block. It is seen that this synchronizing pulse PSY is generated immediately following the occurence of this synchronizing pattern. Delay circuit 49 serves to delay each detected synchronizing pulse PSY to produce the delayed synchronizing pulse PSY' substantially in time coincidence with each generated error detect signal EDT (FIG. 13B). That is, the error detect signal EDT overlaps the delayed synchronizing pulse PSY'. It is appreciated, nevertheless, that the delayed synchronizing pulses PSY' exhibit the same period and repetition rate as the detected synchronizing pulses PSY (FIG. 13D).

Flip-flop circuit 50 is triggered by the delayed synchronizing pulses PSY' to assume the state corresponding to the error detect signal EDT generated by CRC check circuit 43. Thus, if an error is detected in the received data block (EDT="1"), flip-flop circuit 50 is set such that the write enable signal $\overline{WE}$ is a binary "1". Conversely, if no error is detected in the received data block (EDT="0"), flip-flop circuit 50 is reset such that the write enable signal $\overline{WE}$ is a binary "0". In view of the time delay imparted to the incoming data blocks by delay circuit 42, it is recognized that the write enable signal associated with the respective data blocks is generated in substantial time coincidence therewith, as shown in FIG. 13G.

Preferably, the write enable signal $\overline{WE}$ is a pulse signal. If the incoming data blocks are substantially free of error, this pulse signal may appear as a periodic negative-going pulse whose repetition rate is equal to the rate at which successive storage locations in RAM 40 are addressed for a write-in operation. The change-over of such write enable pulses controls selector 44 which, in turn, controls RAM 40 to carry out the write-in operation. When the write enable pulse is at its relatively low level, the RAM is enabled to carry out this write-in operation.

Write block counter 46W is triggered by delayed synchronizing pulse PSY' (FIG. 13E) to load, or store, the write-in address WA which is generated by ROM 51. FIG. 13F illustrates that, in the absence of jitter, the write-in address identifying storage location 4 in RAM 40 is generated when the delayed data block WDT' containing block address BA[0] is supplied to be written into the RAM. Thus, both storage location 4 in RAM 40 and storage compartment 4 in error flag memory 52 are addressed, or selected, to have data written therein.

Write bit counter 45W now counts the write bit clock pulses supplied to write bit clock terminal 47W. As the count of write bit counter 45W is incremented, corresponding bit locations in the storage location of RAM 40 which has been addressed for the write-in operation are enabled, in sequence, to have the successive bits of the data block written thereinto. Thus, delayed data block WDT' is written into the addressed location of RAM 40 serially-by-bit.

It is assumed, herein, that delayed data block WDT' is free of error. Hence, error detect signal EDT is a binary "0", and write enable pulse $\overline{WE}$ appears as a negative-going pulse. Consequently, RAM 40 is enabled to have the delayed data block WDT' written into the addressed location. Also, multiplexer 53 is controlled by controller 55, which is responsive to the negative-going write enable pulse $\overline{WE}$, to supply a binary "0" error flag to error flag memory 52. When the count of write bit counter 45W attains its predetermined count (which, it is recalled, is a maximum count corresponding to the last bit written into the addressed location of RAM 40), controller 55 enables the addressed storage compartment of error flag memory 52 to have the binary "0" error flag written thereinto. Thus, and in accordance with the example shown in FIG. 13F, storage location 4 in RAM 40 has data block WDT' written thereinto; and storage compartment 4 of error flag memory 52 has a binary "0" error flag written therein.

In response to the next-following delayed synchronizing pulse PSY', the foregoing operation is repeated. Thus, storage location 5 in RAM 40 as well as storage compartment 5 in error flag memory 52 are addressed to have the delayed data block WDT' and the error flag, respectively, written thereinto. It is seen, from FIG. 13C, that the data block containing block address BA[1] is written into addressed storage location 5. If this data block is free of error, error detect signal EDT is a binary "0", whereupon the write enable pulse $\overline{WE}$ is a negative-going pulse to enable storage location 5 of RAM 40 to have this data block written thereinto. Likewise, multiplexer 53 is controlled by controller 55 in response to this negative-going write enable pulse $\overline{WE}$ to supply a binary "0" error flag to error flag memory 52, this binary "0" error flag being written into storage compartment 5 when write bit counter 45W attains its maximum count.

However, if an error is detected in the data block containing block address BA[1], such as if this block address is incorrect, or if an error is present in one or more data words included in this data block, error detect signal EDT is a binary "1", thereby resulting in a binary "1" write enable signal $\overline{WE}$. That is, the negative-going write enable pulse is, in this example, not produced. Consequently, RAM 40 is not enabled to have data block WDT' written into addressed storage location 5. Accordingly, if it is assumed that data is non-destructively read out of the RAM, the data block which previously had been stored in storage location 5 remains therein. That is, the erroneous data WDT' does not replace, or over-write, the data block which previously had been stored in this addressed storage location.

Since the write enable signal $\overline{WE}$ is a binary "1", controller 55 now controls multiplexer 53 to supply the binary "1" error flag to error flag memory 52. Therefore, when write bit counter 45W attains its maximum count, controller 55 causes the binary "1" error flag supplied from multiplexer 53 to be written into the storage compartment (i.e. storage compartment 5) which is addressed by block counter 46W. As will be described below, a binary "1" error flag represents that the data block which is stored in the corresponding storage location of RAM 40 is erroneous and should be interpreted as being erroneous data. Thus, in the present example, since storage compartment 5 of error flag memory 52 stores the binary "1" error flag, this error flag is used to indicate that the data block stored in storage location 5 of RAM 40 is erroneous. Of course, since the data block now stored in storage location 5 is equal to the data block which had been stored therein previously, it is clear that such previously stored data block, if re-read from RAM 40, should be interpreted as being erroneous.

As mentioned above, selector 44 is responsive to negative-going write enable pulses $\overline{WE}$ to supply the write-in address WA generated by the write address generator to RAM 40. At all other times, that is, when the write enable signal $\overline{WE}$ is a binary "1", selector 44 supplies the read-out address RA, generated by the read address generator, to the RAM.

It is appreciated that, when a read-out address is supplied to RAM 40 by selector 44, the contents of the addressed storage location in the RAM is read out therefrom serially-by-bit. The bit count of read bit counter 45R identifies the particular bit location in this addressed storage location from which the bits are read out. The read out data block RDT then is supplied to multiplexer 16, described hereinabove with respect to FIG. 5. It is appreciated that the data blocks stored in the addressed storage locations of RAM 40 are read out at a fixed, reference rate determined by the reference read-out clock generator. Furthermore, block counter 46R is incremented periodically so as to generate sequential addresses from which the stored data blocks are read out.

From the example shown in FIGS. 13A–13G, taken in conjunction with the memory map represented by the table of FIG. 12, let it be assumed that storage location 0 in RAM 40 is addressed for a read-out operation. Concurrently therewith, storage compartment 0 of error flag memory 52 also is addressed by the read-out address RA generated by block counter 46R. Let it also be assumed that the data block stored in storage location 0 is free of error. Hence, from the preceding discussion, it is recognized that the error flag stored in storage compartment 0 of error flag memory 52 is a binary "0".

Now, when storage location 0 is addressed for a read-out operation, storage compartment 0 also is addressed. Controller 55 is responsive to this read-out address RA, as well as to the minimum, or smallest, bit address generated by read bit counter 45R to read out the binary "0" error flag from storage compartment 0. Controller 55 also triggers latch circuit 54 to store this read out binary "0". At the next-following bit address, or within a few bit addresses thereafter, controller 55 sets the error flag in storage compartment 0 to a binary "1". Thus, in the present example, after the error flag is read out from the addressed storage compartment of the error flag memory, this error flag is changed over to a binary "1".

The foregoing operation is repeated with each change, or update, in the read-out address RA. Thus, when a particular storage location in RAM 40 is addressed for a read-out operation, the corresponding storage compartment in error flag memory 52 also is addressed. When the first bit of the stored data block is read out of the addressed storage location from RAM 40, the actual error flag associated with this data block is latched in latch circuit 54. Immediately, or soon, thereafter, this error flag in the addressed storage compartment is changed over to a binary "1". Hence, after a data block has been read out of a storage location in RAM 40, the error flag associated with the storage location from which the data block has been read is set so as to indicate that the present contents of that storage location, that is, the contents of that storage location after the read-out operation, now should be construed as being erroneous.

Of course, if an erroneous data block WDT' had been supplied to RAM 40, write enable signal $\overline{WE}$ would have been a binary "1" to inhibit this erroneous data block from being written into the RAM. Also, the storage compartment of error flag memory 52 associated with the storage location in the RAM into which the data block would have been written is supplied with a binary "1" error flag. When, subsequently, the contents of this storage location are read out, the binary "1" error flag associated therewith will be latched in latch circuit 54. Since the data block WDT' had been erroneous and, therefore, was not stored in this storage location, it is seen that the data which is read out of RAM 40 is a data block which had been stored previously in this storage location but had not been replaced by the erroneous data block WDT'. That is, the data now read out of RAM 40 is one that already had been read out therefrom. Since data which is re-read from the RAM should be construed as being erroneous, the binary "1" error flag EFLG associated with this re-read data block, and now stored in latch circuit 54, will be utilized to operate on this re-read data block as an erroneous data block. That is, this binary "1" error flag EFLG is utilized by a decoder (FIG. 5) to process the read-out data block as an error.

It will be recognized that, since each error flag stored in error flag memory 52 is set as a binary "1" when its associated data block is read out from RAM 40, such error flags will not be reset to a binary "0" unless a correct, or error-free, data block is written into the RAM. Therefore, in view of the fact that erroneous data blocks are inhibited from being written into the RAM, the possibility exists that previously read data can be re-read from the RAM. But such re-read data always will be accompanied by a binary "1" error flag EFLG and, hence, will be used by the decoders to interpret the re-read data blocks as being erroneous data blocks.

From the foregoing description, it should be appreciated that, by delaying the loading of an addressed storage compartment of error flag memory 52 with an error flag until the last bit of a data block is written into the RAM, false error flags are prevented from being stored in the error flag memory. For example, if storage location 3 in RAM 40 and storage compartment 3 in error flag memory 52 both are addressed, but a spurious pulse is interpreted as a synchronizing pulse PSY, block counter 46W may be triggered in response to this spurious pulse to generate, for example, address 7. If the write enable pulse $\overline{WE}$ remains at its negative level, a binary "0" error flag now may be stored erroneously in storage compartment 7. But, since an error flag is not written into the error flag memory until write bit counter 45W attains its maximum count, and since the count of this write bit counter will be reset in response to the spurious synchronizing pulse, the binary "0" error flag will not be erroneously written into either storage compartment 3 (which had been addressed previously) or storage compartment 7 (which now is addressed by block counter 46W). Rather, a binary "1" error flag will remain stored in both of these storage compartments.

Since the write-in address WA generated by ROM 51 is determined as a function of the block address BA included in each received data block, it is appreciated that the very same sequence in which correct, or error-free data blocks is written into the RAM also is read out therefrom. Furthermore, CRC check circuit 43 detects the presence of an error in a block address so as to prevent a data block from being written into an erroneous storage location of RAM 40. Consequently, the integrity of the write-in and read-out data block sequences is maintained.

While the present invention has been particularly shown and described with reference to a preferred embodiment, it will be readily apparent to those of ordinary skill in the art that various changes and modifications in form and details may be made without departing from the spirit and scope of the invention. For example, error flag memory 52 may be included in RAM 40 as a separate storage location therein. Also, multiplexer 53 may be omitted, and the actual state of write enable pulse $\overline{WE}$ may be used directly as the error flag written into error flag memory 52. Additionally, a suitable error flag write-in circuit may be provided such that, since each error flag is set to its binary "1" condition after being read out from the error flag memory, an error flag may be reset only if its associated data block is detected as being correct. Still further, although not shown in FIG. 10, a pulse generator, such as a one-shot circuit, may be used to generate a negative-going write enable pulse $\overline{WE}$ of proper duration in response to the setting of flip-flop circuit 50. Moreover, this flip-flop circuit may be replaced by such a one-shot circuit.

It is intended that the appended claims be interpreted as including the foregoing as well as other such changes and modifications.

What is claimed is:

1. Time base correcting apparatus for correcting time base errors in a digital signal supplied thereto in the form of successive data blocks, each data block including at least plural data words and an error detecting word, said apparatus comprising memory means having plural addressable storage locations, each storing a respective data block; write address generating means for generating write-in addresses to identify the particular storage locations into which the supplied data blocks are written; error detecting means responsive to said error detecting word for detecting an error in a supplied data block; write-in means for writing successive data blocks into those storage locations identified by said write address generating means in the absence of an error detected by said error detecting means and for inhibiting the writing of a data block into an identified storage location when an error in said data block is detected; error store means for storing an error signal indicative of whether a supplied data block contains a detected error and has not been written into a respective storage location or does not contain a detected error and has been written into said respective storage location; read address generating means for generating read-out addresses to identify particular storage locations from which a stored data block is read; and read-out means for reading out the contents of a storage location identified by said read address generating means and for setting the error signal in said error store means to indicate that the contents of the storage location then read out by said read-out means contain a detected error notwithstanding the actual condition of said error signal.

2. The apparatus of claim 1 wherein said error store means is comprised of plural storage compartments, each being associated with a respective storage location of said memory means.

3. The apparatus of claim 2 wherein said error signal is a binary signal of a first state to indicate that the data block supplied for writing into an associated storage location contains a detected error and of a second state to indicate that said data block does not contain a detected error.

4. The apparatus of claim 3 further comprising latch means for storing the binary signal in the storage compartment of said error store means then associated with the particular storage location from which a data block is read out; and wherein said read-out means thereafter sets said binary signal in said storage compartment to said first state; whereby if a subsequent data block is not written into said particular storage location, the re-reading out of a previous data block therefrom is accompanied by a binary signal of said first state.

5. The apparatus of claim 4 wherein said data blocks contain multiple bits, and wherein said write address generating means includes write bit address generating means for generating successive bit addresses for each identified storage location into which a supplied data block is to be written; and said error store means is responsive to a relatively high bit address to store said binary signal in the storage compartment associated with said storage location then identified by said write address generating means.

6. The apparatus of claim 5 wherein said relatively high bit address is the last bit address in a storage location.

7. The apparatus of claim 4 wherein said data blocks contain multiple bits; and wherein said read address generating means includes read bit address generating means for generating successive bit addresses for each identified storage location from which a stored data block is read; and said latch means is responsive to a relatively low bit address to store the binary signal in the storage compartment associated with said storage location then identified by said read address generating means.

8. The apparatus of claim 7 wherein said relatively low bit address is the first bit address in a storage location.

9. The apparatus of claim 2 wherein each supplied data block contains a block address representing the relative position of said data block in a predetermined group of blocks; and wherein said error detecting means is operative to detect an error in said block address to inhibit the data block containing the erroneous block address from being written into an identified storage location.

10. The apparatus of claim 1 wherein each supplied data block contains a block address representing the relative position of said data block in a predetermined group of blocks; and wherein said write address generating means comprises means responsive to said block address and to the read-out address then generated by said read address generating means for providing a write-in address.

11. The apparatus of claim 10 wherein said means responsive to said block address and to the read-out address then generated comprises read only memory means having a plurality of addressable locations in which are stored respective write-in addresses, a predetermined location in said read only memory means being addressed by the combination of said block address and said read-out address to cause the write-in address stored at the addressed location therein to be read out.

12. Time base correcting apparatus for correcting time base errors in successive data blocks supplied thereto, each data block including a plurality of multibit words, comprising memory means having a plurality of addressable locations for storing respective data blocks; error flag memory means having a plurality of compartments, each associated with a respective location in said memory means for storing an error flag indicative of an error present in a data block supplied to said time base correcting apparatus; read address generating means for generating successive read-out addresses to identify corresponding storage locations and compartments from which a stored data block and a stored error flag, respectively, are read; means for setting the error flag in the identified compartment to a predetermined condition; write address generating means responsive at least in part to said read-out addresses for generating successive write-in addresses to identify corresponding storage locations and compartments into which a data block and an error flag, respectively, are to be written; error detecting means for detecting an error in said supplied data blocks; and write means for writing a data block into the storage location and for resetting the error flag in the compartment identified by said write address generating means only if an error is not detected in said data block.

13. The apparatus of claim 12 wherein each supplied data block contains a block address representing the relative position of said data block in a group of blocks, and wherein said write address generating means comprises means for producing a write-in address as a function of said block address and the read-out address then generated.

14. The apparatus of claim 12 wherein said write means includes bit counting means for tracking the bits of a supplied data block to be written into an identified storage location; and means for resetting said error flag when a predetermined bit count is attained.

15. The apparatus of claim 14 wherein said error flag is reset approximately when the last bit of a data block is written into said identified storage location.

16. The apparatus of claim 12 wherein said means for setting the error flag includes bit counting means for tracking the bits of a data block read out from an identified storage location; and means for setting said error flag when a predetermined bit count is attained.

17. The apparatus of claim 16 wherein said error flag is set approximately after the first bit of a data block is read out from said identified storage location.

18. The apparatus of claim 17 further comprising latch means actuable to store the error flag in the compartment identified by said read address generating means; and means for actuating the latch means when said first bit of said data block is read out from said identified storage location.

19. The apparatus of claim 18 further comprising utilization means supplied with said data block and error flag read out from said storage location and compartment, respectively, for processing said data block as erroneous if said error flag is set.

* * * * *